United States Patent [19]
Greenspan et al.

[11] Patent Number: 5,740,437
[45] Date of Patent: Apr. 14, 1998

[54] SEPARATING WORK UNIT PRIORITY AND ACCOUNTABILITY FROM ADDRESS SPACES

[75] Inventors: Steven Jay Greenspan, Hyde Park; Stephen Joseph Kinder, Poughkeepsie, both of N.Y.; Michael Gerard Mall, Morgan Hill, Calif.; Bernard Roy Pierce, Poughkeepsie, N.Y.

[73] Assignee: International Business Machines Corporation, Armonk, N.Y.

[21] Appl. No.: 768,038

[22] Filed: Dec. 17, 1996

Related U.S. Application Data

[63] Continuation of Ser. No. 304,995, Sep. 13, 1994, abandoned.
[51] Int. Cl.6 .................................................. G06F 13/00
[52] U.S. Cl. ........................ 395/674; 395/673; 395/401; 395/413
[58] Field of Search ............................. 395/674, 673, 395/401, 413

[56] References Cited

U.S. PATENT DOCUMENTS

| 4,084,228 | 4/1978 | Duford | 364/200 |
|---|---|---|---|
| 4,374,409 | 2/1983 | Bienvenu | 364/200 |
| 4,633,387 | 12/1986 | Hartung et al. | 364/200 |
| 4,918,595 | 4/1990 | Kahm | 364/200 |
| 4,943,913 | 7/1990 | Clark | 364/200 |
| 5,060,150 | 10/1991 | Simor | 364/200 |
| 5,134,696 | 7/1992 | Brown et al. | 395/425 |
| 5,168,566 | 12/1992 | Kuki et al. | 395/650 |
| 5,202,989 | 4/1993 | Hirosawa | 395/650 |
| 5,212,793 | 5/1993 | Donica et al. | 395/700 |
| 5,220,669 | 6/1993 | Baum et al. | 395/775 |
| 5,257,375 | 10/1993 | Clark et al. | 395/350 |

*Primary Examiner*—Lucien U. Toplu
*Attorney, Agent, or Firm*—William A. Kinnaman, Jr.; Bernard M. Goldman

[57] ABSTRACT

Work units are identified, managed and reported on as a group or enclave. The dispatching priorities of the work units are separated from the address spaces executing the work units. Instead, the dispatching priorities are tied to the priority of the enclave allowing work units to be executed within an address space at a priority independent from the address space. Additionally, resources used by the work units are accumulated and allocated to the requestor of the work.

15 Claims, 9 Drawing Sheets

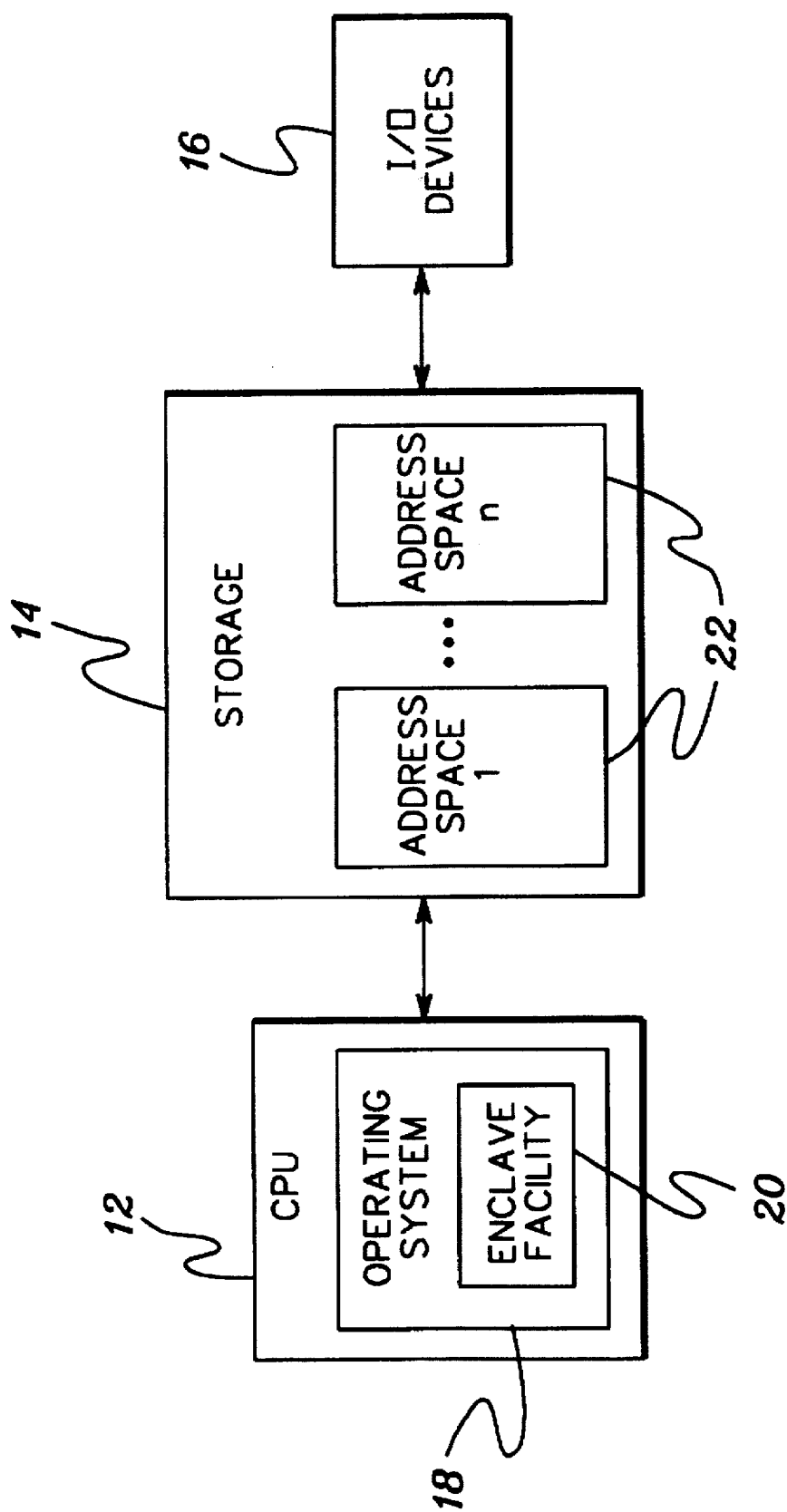

ENCLAVE CONTROL BLOCK

| NAME | VARIABLE TYPE | SIZE (BYTES) |
|---|---|---|
| EncbEyeCatcher | CHARACTER | 4 |
| EncbVersion | UNSIGNED | 1 |
| EncbNext | ADDRESS | 4 |
| EncbPrev | ADDRESS | 4 |
| EncbToken | CHARACTER | 8 |
| EncbPseudoID | UNSIGNED | 2 |
| EncbDP | UNSIGNED | 1 |
| EncbFirstWEBAddr | ADDRESS | 4 |
| EncbTotalCpuTime | CHARACTER | 8 |
| EncbEncCreatTime | BITSTRING | 4 |
| EncbArrivalTime | BITSTRING | 8 |
| EncbOwnerOucbPtr | ADDRESS | 4 |
| EncbOwnerPrevEncb | ADDRESS | 4 |
| EncbOwnerNextEncb | ADDRESS | 4 |
| EncbSavedCpuTime | CHARACTER | 8 |
| EncbNdp | UNSIGNED | 1 |
| EncbPeriodStartService | BITSTRING | 4 |
| EncbWLMServiceClassToken | UNSIGNED | 4 |
| EncbWLMServiceClassName | CHARACTER | 8 |
| EncbScte | ADDRESS | 4 |
| EncbWLmClsfyConnTkn | BITSTRING | 4 |
| EncbWlmClsfyTrxName | CHARACTER | 8 |
| EncbWlmClsfyUserid | CHARACTER | 8 |
| EncbWlmClsfyTrxClass | CHARACTER | 8 |
| EncbWlmClsfySourceLU | CHARACTER | 17 |
| EncbWlmClsfyNetid | CHARACTER | 8 |
| EncbWlmClsfyLuName | CHARACTER | 8 |
| EncbWlmClsfyPlan | CHARACTER | 8 |
| EncbWlmClsfyPackage | CHARACTER | 8 |
| EncbWlmClsfyConnection | CHARACTER | 8 |
| EncbWlmClsfySourceLuLen | SIGNED | 4 |
| EncbWlmClsfySspmPtr | ADDRESS | 4 |
| EncbWlmClsfySspmLen | SIGNED | 4 |
| EncbWlmClsfyAcctPtr | ADDRESS | 4 |
| EncbWlmClsfyAcctLen | SIGNED | 4 |
| EncbWlmClsfyCollection | CHARACTER | 18 |
| EncbWlmClsfyCollectionLen | SIGNED | 4 |
| EncbWlmClsfyCorrelation | CHARACTER | 12 |
| EncbWlmClsfyCorrelationLen | SIGNED | 4 |
| EncbWlmSubsyName | CHARACTER | 4 |
| EncbWlmFunctionName | CHARACTER | 8 |

ENCLAVE VECTOR TABLE

| NAME | VARIABLE TYPE | SIZE (BYTES) |
|---|---|---|
| EnvtEyeCatcher | CHARACTER | 4 |
| EnvtSize | SIGNED | 4 |
| EnvtFreeEntryPtr | ADDRESS | 4 |
| EnvtNextAvailSeqNum | UNSIGNED | 4 |
| EnvtEntriesInUse | UNSIGNED | 2 |
| EnvtEncbSize | ADDRESS | 2 |
| Envte_Next_Free_Ptr | ADDRESS | 4 |
| Envte_EncbPtr | ADDRESS | 4 |

SEPARATING WORK UNIT PRIORITY AND ACCOUNTABILITY FROM ADDRESS SPACES

This application is a continuation of application Ser. No. 08/304,995, filed Sep. 13, 1994, now abandoned.

TECHNICAL FIELD

This invention relates in general to executing work within a data processing system, and in particular, to executing work within an address space of the data processing system at a priority, which is independent from the priority of the address space. Additionally, the invention relates to accumulating resources consumed by the work and providing the total of accumulated resources to the requestor of the work.

BACKGROUND ART

Various data processing systems use virtual addressing in order to increase the addressability of storage. Such systems further include one or more address spaces. Each address space is a consecutive sequence of integer numbers (virtual address), together with the specific transformation parameters which allow each number to be associated with a byte location in storage. One example of a data processing system using address spaces is offered by International Business Machines Corporation and is defined according to the Enterprise Systems Architecture (ESA). The Enterprise systems Architecture is described in detail in Enterprise Systems Architecture/390 Principles of Operation, IBM Publication Number SA22-7201-01 (April 1993), which is hereby incorporated herein by reference in its entirety.

In one example, a system may include various address spaces, such as a primary, secondary and home address space. As is known, many of the attributes of an address space, and in particular, the home address space, are inherited by the work units associated with that address space. In particular, a work unit inherits its addressability (i.e., a work unit can always address its home address space), priority and accounting from its home address space.

The tie between the work unit and the address spaces, especially the home address space, has caused some problems in managing system performance and balancing work load within the data processing system. This is particularly true when server spaces are involved. A server space is an address space which is performing work for a client (i.e., the initiator or requestor of the work). When a server space is performing work for a client, there may be no addressing tie to the original home address space. Therefore, the server space becomes the home address space for the work being performed. As a result, the work executes with the priority of the server space. This has an effect of causing low and high priority work to execute at the same priority, thereby potentially degrading system performance.

Similarly, the tie between a work unit and its home address space has an negative impact on accounting for the resources consumed by the work unit. Since the work unit executes with the server space as its home address space, the server space is charged for the resources consumed instead of the requestor. Thus, charges are not properly allocated to the client.

Therefore, a need exists for a mechanism in which priority and accounting are removed from the address spaces, and in particular, the home address space. Further, a need exists for a mechanism in which priority is directly tied to the work unit, such that the priority of the work unit is independent of the priority of the address space. Yet further, a need exists for a technique to provide the initiator of work with the cost of that work.

SUMMARY OF THE INVENTION

The shortcomings of the prior art are overcome and additional advantages are provided through the provision of a method and system for executing work within a data processing system. The data processing system has one or more address spaces, and each of the address spaces has an address space priority. One or more work units are associated with an enclave having an enclave priority. Each of the work units is executed in at least one of the address spaces at a priority, which is based on the enclave priority.

In one embodiment, the enclave priority is independent of the address space priority of any of the address spaces. Therefore, work units executing within an address space may execute at a priority which is different from the priority of the address space.

In a further embodiment, the enclave is created by attaching the enclave to an enclave vector table and providing an indication that the enclave is attached to the enclave vector table.

In still a further embodiment, the enclave is deleted, by, for example, disassociating the work units from the enclave and removing the enclave from the enclave vector table.

In another aspect of the invention, the resources consumed by the work units are accumulated and a total of the accumulated resources is provided to the owner or initiator of the work units.

The separation of priority and accounting from address spaces, in accordance with the present invention, advantageously increases system responsiveness. For example, each work unit may be executed at an appropriate priority level for the particular work unit instead of at the priority of the address space, which may be too low or too high.

Further, the technique of the present invention enhances accounting of resource consumption by accruing resource consumption of the work units to the requestor of the work. This ensures that the proper address space is charged for the work being performed. Yet further, resource consumption of the enclave can be managed collectively by, for example, a system resource manager of the operating system.

Additional benefits are realized by the technique of the present invention. It is possible to monitor the performance of the enclave, and if it is unsatisfactory, the enclave priority may be changed automatically such that each work unit within the enclave is dispatched and executed at the new priority value.

Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 1 depicts one example of a block diagram of a data processing system incorporating the enclave facility of the present invention;

FIG. 2 depicts one embodiment of the fields associated with an enclave control block, in accordance with the principles of the present invention;

FIG. 3 depicts one embodiment of the fields associated with an enclave vector table, in accordance with the principles of the present invention;

BEST MODE FOR CARRYING OUT THE INVENTION

Figure 4:
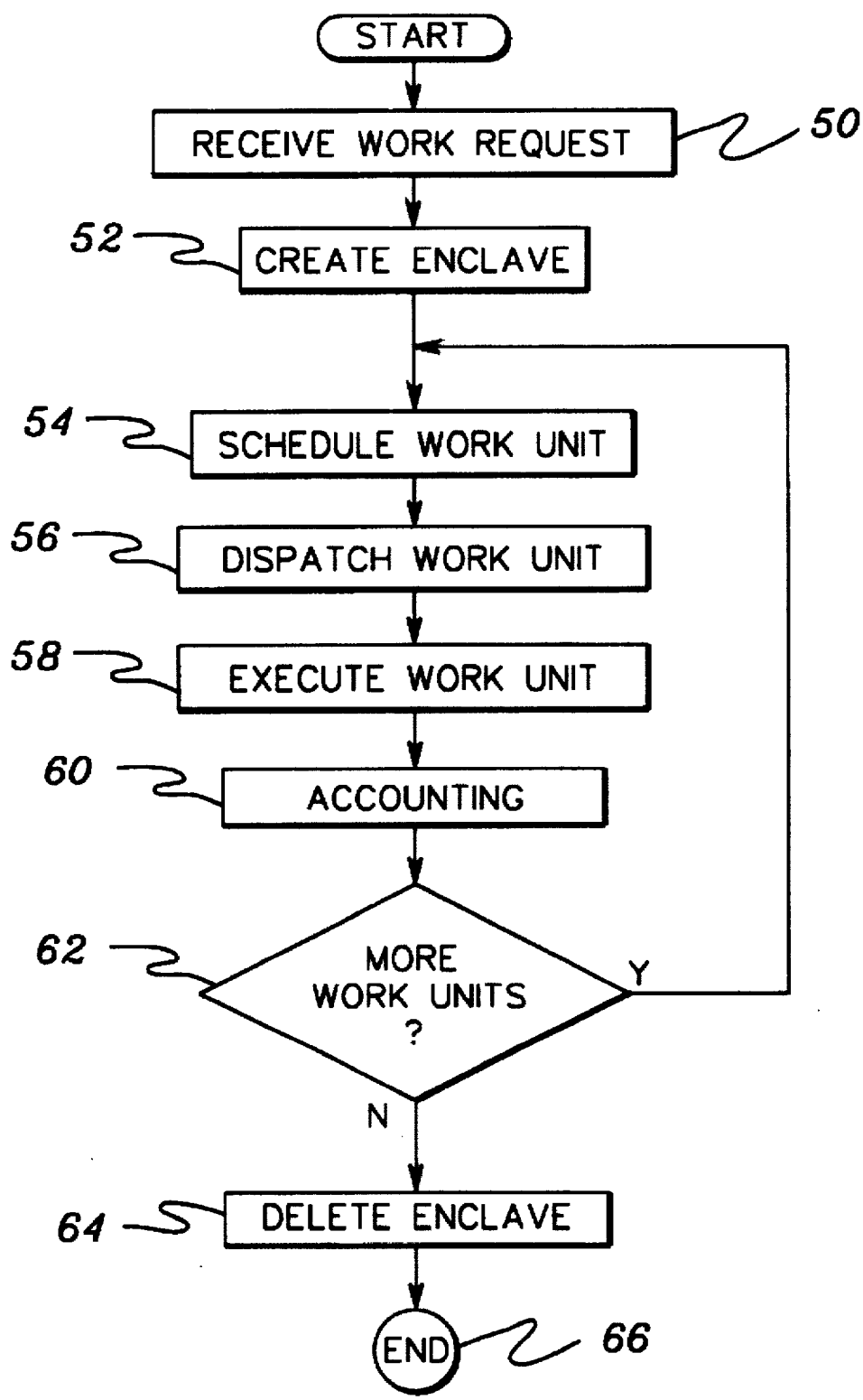
FIG. 4 is one embodiment of the logic associated with a technique for separating priority and accounting of work units from address spaces, in accordance with the principles of the present invention.

In accordance with the principles of the present invention, mechanisms are provided for separating work prioritization from the address space in which the work executes. As described in detail below, the priority at which a particular work unit executes is derived from a priority value associated with an enclave and not the address space executing the work unit. The priority of the work unit and the enclave is independent from the address space. In other words, the priority of the address space does not matter to the work unit. In another embodiment, accounting mechanisms are provided for tracking the resources used by the work units and reporting these resources to the initiator of the work units. In one example, an initiator is a program or user requesting work. In another example, the initiator is an address space associated with the enclave, e.g., the address space that requested the work or the address space that owns the enclave.

One embodiment of a data processing system incorporating the mechanisms of the present invention is depicted in FIG. 1. Data processing system 10 is defined following, for example, the Enterprise Systems Architecture/390 (ESA/390) offered by International Business Machines Corporation. One embodiment of ESA/390 is described in detail in Enterprise Systems Architecture/390 Principles of Operation, Publication Number SA22-7201-01 (IBM Corporation, April 1993), which is hereby incorporated by reference in its entirety.

In one example, data processing system 10 includes, for instance, at least one central processing unit 12, a storage 14 and one or more input/output (I/O) devices 16. Each of these components is described in detail below.

As is known, central processing unit (CPU) 12 (or central processing units, if there are more than one) is the controlling center of the data processing system. In one example, central processing unit 12 executes an operating system 18, such as International Business Machines' Multiple Virtual Storage (MVS) operating system, for controlling sequencing and execution of instructions, programs, and data, and for providing timing functions and other machine related functions. In addition, in accordance with the principles of the present invention, operating system 18 includes an enclave facility 20, which as described in detail below is used to separate work prioritization and accountability from address spaces.

Central processing unit 12 is coupled to a storage (or memory) 14. Storage 14 is a repository for programs and data loaded into the storage by one or more input devices. Storage 14 is, for instance, directly addressable and provides for high-speed processing of data by central processing unit 12. In one embodiment, storage 14 includes one or more virtual address spaces 22. Typically, an entire virtual address space 22 is not resident within the main memory. Instead, only that portion associated with a program or data being accessed or used by one or more of the central processor units is resident with the main storage.

Storage 14 is also coupled to input/output devices 16. One example of input/output devices 16 includes printers, magnetic tape units, direct access storage devices (DASD), displays, keyboards, communications controllers, teleprocessing devices, and sensor-based equipment.

As described above, an enclave facility is provided, in accordance with the principles of the present invention, to separate work priority and accounting from address spaces. At this time, the enclave facility and, in particular, enclaves and structures associated with the enclaves will be described in detail.

An enclave is a unit or group. In one embodiment, an enclave represents one or more work units and enables the work units to be managed and reported on as a single group. The enclave has a number of characteristics associated therewith, including, for instance, an enclave priority, performance objectives, accounting and management characteristics. The characteristics of the enclave are used in defining attributes for each work unit. For example, in accordance with the principles of the present invention, the priority at which a particular work unit is dispatched and executed is based upon the priority of the enclave. That is, the enclave priority determines where on a dispatching queue a particular work unit is placed.

One structure associated with an enclave is an enclave control block, which contains a number of fields used in defining the enclave. (An enclave control block contains the storage representing an enclave.) One example of the fields associated with an enclave control block (ENCB) 24 is described below with reference to FIG. 2:

a) EncbEyeCatcher is a 4-byte character field storing an acronym. In one example, the eye catcher is ENCB.

b) EncbVersion is a 1-byte unsigned integer representing the version of the enclave control block.

c) EncbNext is a 4-byte address pointing to the next enclave control block.

d) EncbPrev is a 4-byte address pointing to the previous enclave control block.

e) EncbToken is an 8-byte character field representing an enclave token. In one example, the enclave token includes the following:

1) An EncbEnvt$_{13}$offset, which is a 4-byte unsigned integer offset into an enclave vector table (ENVT), described below, indicating where this enclave block has been registered. The offset when added to the address of the enclave vector table locates an entry in the enclave vector table (ENVTE); and 2) An EncbTokenSeq#, which is a 4-byte unsigned integer sequence number assigned during registration of the enclave block as a unique identifier of this enclave block.

f) EncbPseudoID is a 2-byte unsigned integer including an offset into the enclave vector table (i.e., ENVT slot number). If the id is equal to one, then it is the origin of the array in the enclave vector table. There is a high order bit, which is usually on, and which is ignored when the id is used as an index.

g) EncbDP is a 1-byte unsigned integer representing the dispatching priority of the enclave. In one embodiment, this dispatching priority represents the major priority for each work unit.

h) EncbFirstWEBAddr is a 4-byte address of the first work unit (i.e., work element block).

i) EncbTotalCpuTime is an 8-byte character field representing total accumulated enclave CPU time.

j) EncbEncCreatTime is a 4-byte bitstring indicating the time that the enclave was created.

k) EncbArrivalTime is an 8-byte bitstring representing a timestamp indicating when the work request arrived in the system. In one example, the time is in store clock (STCK) format.

l) EncbOwnerOucbPtr is a 4-byte address indicating the owner address space, which owns the enclave.

m) EncbOwnerPrevEncb is a 4-byte address indicating the previous Encb on a chain of enclaves with the same owner.

n) EncbOwnerNextEncb is a 4-byte address indicating the next Encb on a chain of enclaves with the same owner.

o) EncbSavedCpuTime is an 8-byte character representing a value of the EncbTotalCpuTime when the service request manager (SRM) of the operating system last calculated service.

p) EncbNdp is a 1-byte unsigned integer representing a new dispatch priority at which associated work units are to be run (by, for example, SRM). This may differ from the EncbDP. When SRM wishes to change the priority, the value of EncbNdp is copied into EncbDP.

q) EncbPeriodStartService is a 4-byte string representing the amount of CPU service accumulated when the period started.

One or more of the following controls are used by the operating system and, in one example, the work load manager (WLM) of the operating system, for classification. Some of the fields described below receive their values as a result of performing classification and many of the following fields are directly associated with the respective fields in IWMCLSFY, described below:

r) EncbWLMServiceClassToken is a 4-byte unsigned integer indicating the service class token, which is input to the enclave control block as a result of classification, described below.

s) EncbWLMServiceClassName is an 8-byte character field representing the service class name, which is input to the enclave control block as a result of classification.

t) EncbScte is a 4-byte address representing a pointer to a service class table entry, which is also input to the enclave control block as a result of classification.

u) EncbWlmClsfyConnTkn is a 4-byte bitstring identifying who is performing the classification.

v) EncbWlmClsfyTrxName is an 8-byte character field representing the name of the transaction requesting the work.

w) EncbWlmClsfyUserid is an 8-byte character field representing a userid associated with the work request.

x) EncbWlmClsfyTrxClass is an 8-byte character field indicating a name of a transaction class.

y) EncbWlmClsfySourceLu is a 17-byte character field representing a source logical unit (LU) name associated with the requestor of the work.

z) EncbWlmClsfyNetid is an 8-byte character field identifying the network associated with the requestor.

aa) EncbWlmClsfyLuName is an 8-byte character field representing the local logical unit (LU) name associated with the requestor.

bb) EncbWlmClsfyPlan is an 8-byte character field indicating an access plan name for a set of associated Structured Query Language (SQL) statements. (SQL, offered by International Business Machines, is known in the art.)

cc) EncbWlmClsfyPackage is an 8-byte character field representing a package name for a set of associated SQL statements.

dd) EncbWlmClsfyConnection is an 8-byte character field identifying the name associated with the environment creating the work request.

ee) EncbWlmClsfySourceLuLen is a 4-byte signed integer representing the length of the source LU.

ff) EncbWlmClsfySspmPtr is a 4-byte address pointing to the subsystem parm block.

gg) EncbWlmClsfySspmLen is a 4-byte signed integer representing the length of the subsystem parm block.

hh) EncbWlmClsfyAcctPtr is a 4-byte address pointing to the account info block.

ii) EncbWlmClsfyAcctLen is a 4-byte signed integer representing the length of the account info block.

jj) EncbWlmClsfyCollection is an 18-byte character field representing the name for a group of associated packages.

kk) EncbWlmClsfyCollectionlen is a 4-byte signed integer representing the length of the collection name.

ll) EncbWlmClsfyCorrelation is a 12-byte character field representing the name associated with the user/program creating the work request.

mm) EncbWlmClsfyCorrelationlen is a 4-byte signed integer representing the length of the correlation name.

nn) EncbWlmSubsysName is a 4-byte character field representing the subsystem name of the requestor.

oo) EncbWlmFunctionName is an 8-byte character field representing the function name.

In a manner described herein, the enclave control block is attached to an enclave vector table 26, which is described below with reference to FIG. 3. The enclave vector table includes a header and an array. Initially, the header is described. The header includes, for example, the following:

a) EnvtEyeCatcher is a 4-byte character field representing an acronym. In one example, the eye catcher is ENVT.

b) EnvtSize is a 4-byte signed integer representing the size of the enclave vector table. In one example, it is used for validating an enclave token.

c) EnvtFreeEntryPtr is a 4-byte address indicating the offset (from the ENVT) of the first free entry or 0 if all entries are in use.

The EnvtFreeEntryPtr includes, for example, a high order bit (EnvtFreePtrHighBit), which is turned off when EnvtFreeEntryPtr is copied into an Encb.

d) EnvtNextAvailSeqNum is a 4-byte unsigned integer indicating the next available sequence number in the enclave vector table. Every enclave block will have a unique sequence number. Zero is never valid.

e) EnvtEntriesInUse is a 2-byte unsigned integer representing the current number of allocated enclaves.

f) EnvtEncbSize is a 2-byte unsigned integer indicating the size of the enclave control block in bytes. This control is used by WLM to obtain ENCB storage.

The following controls are associated with the array of the enclave vector table:

g) Envte_Next_Free_Ptr is a 4-byte address indicating the next available free entry in the enclave vector table. If this is the last free entry, then the value of Envte_Next_Free_Ptr is zero. If the high order bit is on, then this entry in the array is available for use.

h) Envte EncbPtr is a 4-byte address pointing to the enclave control block.

Using the structures described above, processing associated with the enclave facility of the present invention will be described in detail. One example of a technique for separating the priority and accounting of work units from address spaces, in accordance with the principles of the present invention, is depicted in FIG. 4 and described in detail below.

Initially, a work request is received by a transaction manager from, for example, a user or a program, STEP 50 "RECEIVE WORK REQUEST." (One example of a transaction manager is DB2 offered by International Business Machines Corporation.) The work request is, for example, a business transaction which includes one or more work units to be processed. When the transaction manager receives the work request, it initiates creation of an enclave by for example, invoking a service referred to as IWMECREA, STEP 52 "CREATE ENCLAVE." As described in detail below, during creation of the enclave, an operating system, such as MVS, allocates storage for an enclave control block, classifies the work request via, for instance, a service referred to as IWMCLSFY, sets the enclave priority and attaches the enclave control block to the enclave vector table.

Subsequent to creating the enclave, one of the work units of the work request is scheduled, STEP 54 "SCHEDULE WORK UNIT." As described in detail below, in one example, the transaction manager commences scheduling of a work unit by invoking a service referred to as IEAM-SCHD. During scheduling, the operating system queues the work unit to the enclave and to a dispatching queue. Thereafter, the work unit is dispatched, STEP 56 and executed by the operating system, STEP 58.

During execution of the work unit and/or after execution of the work unit completes, an accounting is performed by the operating system to track the resources used by the work unit, STEP 60 "ACCOUNTING." In accordance with the principles of the present invention, resources used by the work unit accrue to the initiator of the work (i.e., e.g., the owner of the enclave or the requestor of the work), instead of the address space executing the work unit.

Subsequently, a determination is made as to whether there are any more work units, INQUIRY 62. If there are more work units, then processing continues with scheduling the next work unit, STEP 54. It should be noted that more than one work unit may be scheduled, dispatched, and/or executed at a time. The above-described processing flow is only one example.

When there are no more work units to be processed, the enclave may be deleted, STEP 64 "DELETE ENCLAVE." In one example, deletion of the enclave is initiated via the transaction manager by invoking a service referred to as IWMEDELE. This service is described in detail below. Thereafter, processing is complete, STEP 66 "END."

The above-described technique is explained using a transaction manager (e.g., DB2) and an operating system (e.g., MVS). This is only one example. It will be apparent to those skilled in the relevant art that the technique may be performed between other systems, other transaction managers, and/or other operating systems without departing from the spirit of the invention.

Each of the above-mentioned services will now be described in detail. As previously discussed, in order to create an enclave, a service referred to as IWMECREA is used. However, in one example, prior to invoking IWMECREA, IWMCLSFY is invoked in order to initialize certain classification parameters used by IWMECREA. This particular invocation (i.e., IWMCLSFY in a modified form) allows the parameters to be accumulated in a parameter area without calling the classify service routine. One example of the syntax associated with the IWMCLSFY service is described below. (In this embodiment, some of the fields are listed as required and others are listed as optional. This is only one example and it may be different for other embodiments):

| ?IWMCLSFY | [TRXNAME({xtrxname\|NO_TRXNAME})]<br>[USERID({xuserid\|NO_USERID})]<br>[TRXCLASS({xtrxclass\|<br>  NO_TRXCLASS})]<br>[ACCTINFO({xacctinfo\|<br>  NO_ACCTINFO})<br>    ACCTINFL(xacctinfl)]<br>[SOURCELU({xsourcelu\|<br>  NO_SOURCELU})]<br>[NETID({xnetid\|NO_NETID})]<br>[LUNAME({xluname\|NO_LUNAME})]<br>[SUBSYSPM({xsubsyspm\|<br>  NO_SUBSYSPM})<br>    SSPMLEN(xsspmlen)]<br>[COLLECTION({xcollection\|<br>  NO_COLLECTION})<br>    COLLECTION_LEN(xcollection_<br>    len)]<br>[PLAN({xplan\|NO_PLAN})]<br>[PACKAGE({xpackage\|NO_PACKAGE})]<br>[CONNECTION({xconnection\|<br>  NO_CONNECTION})]<br>[CORRELATION({xcorrelation\|<br>  NO_CORRELATION})<br>    CORR_LEN(xcorr_len)]<br>CONNTKN(xconntkn)<br>SERVCLS(xservcls)<br>[SRVCLSNM(xsrvclsnm)<br>[RPTCLSNM(xrptclsnm)]<br>[RETCODE(xretcode)]<br>[RSNCODE(xrsncode)] |
|---|---|

Where:

[TRXNAME({xtrxname\|NO_TRXNAME})] is the name (RS-type) (or address in register (2)-(12) ASM only) of an optional 8 character input which contains the transaction name for the work request, as known by the work manager. For environments where the transaction name is available on some, but not all flows, provision of a data area initialized to all blanks is equivalent to specification of NO_TRXNAME.

DEFAULT: NO_TRXNAME indicates that no transaction name is passed.

[USERID({xuserid\|NO_USERID})] is the name (RS-type) (or address in register (2)-(12) ASM only) of an optional 8 character input which contains the userid associated with the work request. For environments where the user id is available on some, but not all flows, provision of a data area initialized to all blanks is equivalent to specification of NO_USERID.

DEFAULT: NO_USERID indicates that no userid is passed.

[TRXCLASS({xtrxclass\|NO_TRXCLASS})] is the name (RS-type) (or address in register (2)-(12) ASM only) of an optional 8 character input which contains a class name within the subsystem. This can be any meaningful value that the installation can recognize and specify to match the value presented by the work manager. For environments where the transaction class is available on some, but not all flows, provision of a data area initialized to all blanks is equivalent to specification of NO_TRXCLASS.

DEFAULT: NO_TRXCLASS indicates that no transaction class was passed.

[ACCTINFO({xacctinfo|NO_ACCTINFO})] is the name (RS-type) (or address in register (2)–(12) ASM only) of an optional character input which contains the accounting information. For environments where accounting information is available on some, but not all flows, provision of a data area initialized to all blanks is equivalent to specification of NO_ACCTINFO.

DEFAULT: NO_ACCTINFO indicates that no accounting information was passed.

ACCTINFL(xacctinfl)] is the name (RS-type) (or address in register (2)–(12) ASM only) of a required fullword input which contains the length of the accounting information field. The maximum value supported, in one embodiment, is 143.

[SOURCELU({xsourcelu|NO_SOURCELU})] is the name (RS-type) (or address in register (2)–(12) ASM only) of an optional character input which contains the logical unit (LU) name associated with the requestor. This may be the fully qualified NETID.LUNAME, e.g. network name (1–8 bytes), followed by the logical unit (LU) name for the requestor (1–7 bytes). It may also be the 1–8 byte local LU name, with no network qualifier. The SOURCELU field may be from, for example, 1–17 characters.

SOURCELU is mutually exclusive with NETID/LUNAME.

DEFAULT: NO_SOURCELU indicates that no source LU name was passed.

[NETID({xnetid|NO_NETID})] is the name (RS-type) (or address in register (2)–(12) ASM only) of an optional 8 character input which contains the network identifier associated with the requestor. For environments where the network identifier may be available on some, but not all flows, provision of a data area initialized to all blanks is equivalent to specification of NO_NETID.

SOURCELU is mutually exclusive with NETID.

DEFAULT: NO_NETID indicates that no network identifier is passed.

[LUNAME({xluname|NO_LUNAME})] is the name (RS-type) (or address in register (2)–(12) ASM only) of an optional 8 character input which contains the local LU name associated with the requestor. For environments where the local LU name may be available on some, but not all flows, provision of a data area initialized to all blanks is equivalent to specification of NO_LUNAME.

SOURCELU is mutually exclusive with LUNAME.

DEFAULT: NO_LUNAME indicates that no local LU name is passed.

[SUBSYSPM({xsubsyspm|NO_SUBSYSpM}) is the name (RS-type) (or address in register (2)–(12) ASM only) of an optional character input which contains character data related to the work request which is passed by the work manager for use in classification. The nature of the contents of this data must be documented for customer use. For environments where the subsystem parameter is available on some, but not all flows, provision of a data area initialized to all blanks is equivalent to specification of NO_SUBSYSPM.

DEFAULT: NO_SUBSYSPM indicates that no parameter was passed.

SSPMLEN(xsspmlen)] is the name (RS-type) (or address in register (2)–(12) ASM only) of a required fullword input which contains the length of the data passed by the work manager. There is no restriction on the length of data passed, but all storage between the start and end must be allocated (e.g., getmained).

[COLLECTION({xcollection|NO_COLLECTION}) is the name (RS-type) (or address in register (2)–(12) ASM only) of an optional character input which contains the customer defined name for a group of associated packages. For environments where the collection name may be available on some, but not all flows, provision of a data area initialized to all blanks is equivalent to specification of NO_COLLECTION.

DEFAULT: NO_COLLECTION indicates that no COLLECTION name is passed.

COLLECTION_LEN(xcollection_len) is the name (RS-type) (or address in register (2)–(12) ASM only) of a required fullword input which contains the length of the collection name. There is no restriction on the length of data passed, but all storage between the start and end must be allocated (e.g., getmained).

[PLAN({xplan|NO_PLAN})] is the name (RS-type) (or address in register (2)–(12) ASM only) of an optional 8 character input which contains the access plan name for a set of associated SQL statements. For environments where the plan name may be available on some, but not all flows, provision of a data area initialized to all blanks is equivalent to specification of NO_PLAN.

DEFAULT: NO_PLAN indicates that no PLAN name is passed.

[PACKAGE({xpackage|NO_PACKAGE})] is the name (RS-type) (or address in register (2)–(12) ASM only) of an optional 8 character input which contains the package name for a set of associated SQL statements. Products using this attribute must chose a specific package name to be associated with the work request, e.g., the first package name used in the unit of work. Individual product documentation will describe how this choice is made to allow the installation to use the work load manager (WLM) administrative application. For environments where the package name may be available on some, but not all flows, provision of a data area initialized to all blanks is equivalent to specification of NO_PACKAGE.

DEFAULT: NO_PACKAGE indicates that no PACKAGE name is passed.

[CONNECTION({xconnection|NO_CONNECTION})] is the name (RS-type) (or address in register (2)–(12) ASM only) of an optional 8 character input which contains the name associated with the environment creating the work request, which may reside anywhere within the network. For environments where the connection name may be available on some, but not all flows, provision of a data area initialized to all blanks is equivalent to specification of NO_CONNECTION.

DEFAULT: NO_CONNECTION indicates that no CONNECTION name is passed.

[CORRELATION({xcorrelation|NO_CORRELATION})] is the name (RS-type) (or address in register (2)–(12) ASM only) of an optional character input which contains the name associated with the user/program creating the work request, which may reside anywhere within the network. For environments where the correlation name may be available on some, but not all flows, provision of a data area initialized to all blanks is equivalent to specification of NO_CORRELATION.

DEFAULT: NO_CORRELATION indicates that no CORRELATION name is passed.

CORR_LEN(xcorr_len) is the name (RS-type) (or address in register (2)–(12) ASM only) of a required fullword input which contains the length of the correlation identifier. There is no restriction on the length of data passed, but all storage between the start and end must be allocated (e.g., getmained).

CONNTKN(xconntkn) is the name (RS-type) (or address in register (2)–(12) ASM only) of a required 32 bit input which indicates who is doing the classification.

SERVCLS(xservcls) is the name (RS-type) (or address in register (2)–(12) ASM only) of a required 32 bit output which is to receive the output token which represents the service and report class for the work request.

[SRVCLSNM(xsrvclsnm)] is the name (RS-type) (or address in register (2)–(12) ASM only) of an optional 8 character output which is to receive the output service class name.

[RPTCLSNM(xrptclsnm)] is the name (RS-type) (or address in register (2)–(12) ASM only) of an optional 8 character output which is to receive the output report class name.

[RETCODE(xretcode)] is the name (RS-type) (or register (2)–(12) ASM only) of an optional fullword output variable into which the return code is to be copied from GPR 15.

[RSNCODE(xrsncode)] is the name (RS-type) (or register (2)–(12) ASM only) of an optional fullword output variable into which the reason code is to be copied from GPR 0.

Subsequent to initializing the parameter area with classification parameters to be used in the create routine, IWMECREA is called in order to create an enclave. One embodiment of the syntax of IWMECREA is described below. (In this embodiment, some of the fields are listed as required and others are listed as optional. This is only one example and it may be different for other embodiments.):

| ?IWMECREA | CLSFY(xclsfy) |
| | ARRIVALTIME(xarrivaltime) |
| | FUNCTION_NAME(xfunction_name) |
| | ETOKEN(xetoken) |
| | [RETCODE(xretcode)] |
| | [RSNCODE(xrsncode)] |

Where:

CLSFY(Xclsfy) is the name (RS-type) (or address in register (2)–(12) ASM only) of a required character input which contains the classification information in the format of the parameter list for IWMCLSFY. Note that this name is the data area name, not its pointer. As described previously, IWMCLSFY is invoked by the transaction manager and processed by the operating system in a modified form prior to invocation of IWMECREA in order to initialize this data area with the needed classification information.

The variable length fields associated with the classify parameter list given by the CLSFY keyword have the following limitations in addition to those documented in IWMCLSFY:

SUBSYSPM is limited to 255 bytes
COLLECTION is limited to 18 bytes
CORRELATION is limited to 12 bytes ARRIVALTIME(xarrivaltime) is the name (RS-type) (or address in register (2)–(12) ASM only) of a required 64 bit input which contains the work arrival time in store clock (STCK) format. This is the time at which a business work request is considered to have arrived and from which point the system evaluates elapsed time for the work request.

FUNCTION_NAME(xfunction_name) is the name (RS-type) (or address in register (2)–(12) ASM only) of a required 8 character input which contains a descriptive name for the function for which the enclave was created.

ETOKEN(xetoken) is the name (RS-type) (or address in register (2)–(12) ASM only) of a required 8 character output which will receive the enclave token (EncbToken) after the enclave token is attached to the enclave vector table.

[RETCODE(xretcode)] is the name (RS-type) (or register (2)–(12) ASM only) of an optional fullword output variable into which the return code is to be copied from general purpose register (GPR) 15.

[RSNCODE(xrsncode)] is the name (RS-type) (or register (2)–(12) ASM only) of an optional fullword output variable into which the reason code is to be copied from GPR 0.

The address space that creates an enclave is the owner of that enclave. The CPU time accrued by all of the work units in an enclave is accumulated, for example, in the owner's address space (i.e., the one for whom work is performed).

Figure 5A:
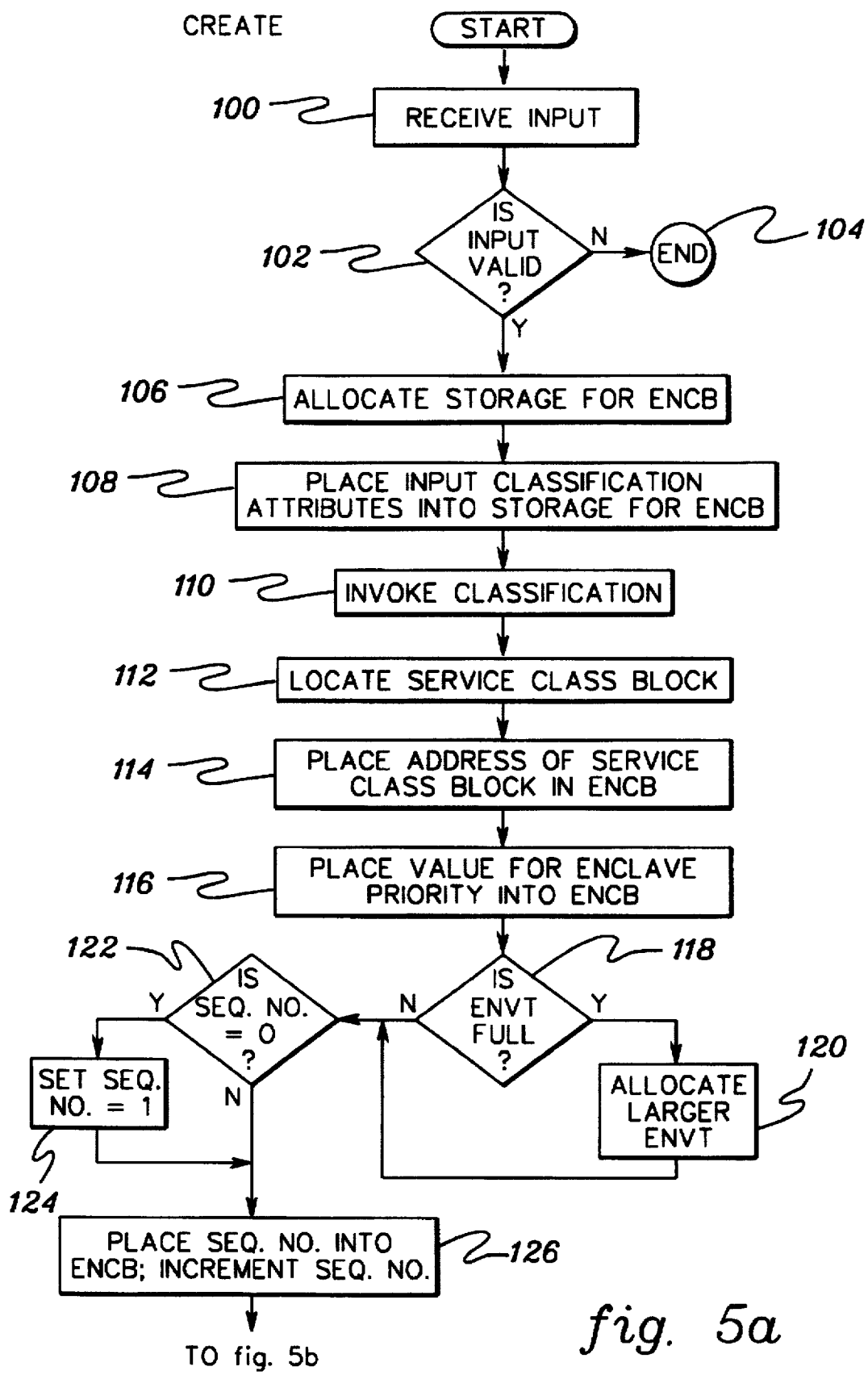
FIGS. 5a–5b depict one example of the logic corresponding to creating an enclave, in accordance with the principles of the present invention.
Figure 5B:
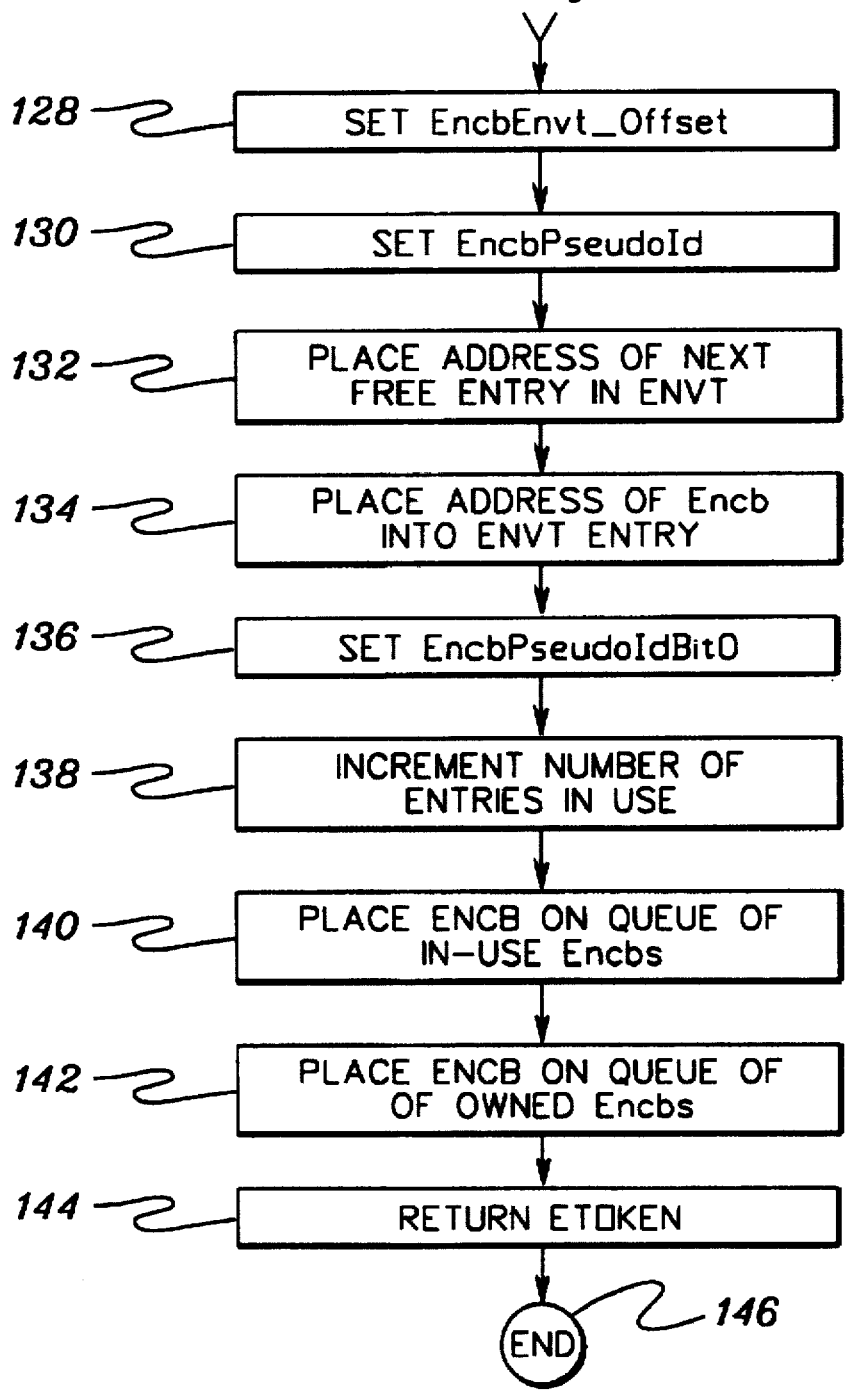

One example of the logic associated with IWMECREA is described below with reference to FIGS. 5a and 5b. (This is only one example. It is possible in other examples for the steps described below to be performed in a different order or to be combined with other steps.)

When the transaction manager invokes IWMECREA, the operating system (e.g., MVS) receives the input that is listed in the enclave control block, STEP 100 "RECEIVE INPUT." Specifically, the classification information needed to perform classification for the enclave (CLSFY), the arrival time of the work request (ARRIVALTIME), and the name of the function for which the enclave was created (FUNCTION_NAME) are provided to the operating system.

Thereafter, a determination is made as to whether the input is valid, INQUIRY 102 "IS INPUT VALID?" This determination is made based on the installation policy for the data processing system. If the input is invalid, then processing of the enclave create is terminated, STEP 104 "END." However, if the input is valid, then the operating system allocates storage for the enclave control block (ENCB), STEP 106 "ALLOCATE STORAGE FOR ENCB."

Subsequent to allocating the storage, the input classification attributes of CLSFY are placed into the enclave control block in the appropriate fields. In particular, EncbWlmClsfyConnTkn, EncbWlmClsfyTrxName, EncbWlmClsfyUserid, EncbClsfyTrxClass, EncbWlmClsfySourceLu, EncbWlmClsfyNetid, EncbWlmClsfyLuName, EncbWlmClsfyPlan, EncbWlmClsfyPackage, WncbWlmClsfyConnection, EncbWlmClsfySourceLuLen, EncbWlmClsfySspmPtr, EncbWlmClEncbWlmCen, EncbWlmClsfyAcctPtr, EncbWlmClsfyAcctLen, EncbWlmClsfyCollection, EncbWlmClsfyCollectionlen, EncbWlmClsfyCorrelation, EncbWlmClsfyCorrelationlen of the enclave control block are filled in with the information located in CLSFY, STEP

108 "PLACE INPUT CLASSIFICATION ATTRIBUTES INTO STORAGE FOR ENCB."

Subsequent to filling in the control block with the classification parameters, classification is invoked to determine the name of the service class for the work request, STEP 110 "INVOKE CLASSIFICATION." Classification procedures are known in the art, however, in accordance with the principles of the present invention, these procedures are applied to enclaves. The procedure for classification of enclaves is similar to the procedure for address spaces. One example of classification is described in detail in MVS/ESA PLANNING: WORKLOAD MANAGEMENT (IBM Publication Number: GC28-1493) (Second edition, June 1994), which is incorporated herein by reference in its entirety.

After the service class name is determined, it is placed in the enclave control block in a field called EncbWlmServiceClassName. Thereafter, the operating system locates the service class block which corresponds to the service class name, STEP 112 "LOCATE SERVICE CLASS BLOCK," and the address of the service class block is placed in the enclave control block in EncbScte, STEP 114.

Subsequently, an enclave priority (also referred to as a major priority) is determined for the enclave. For this invention, the particular value of the enclave priority is not important. What is important is that an enclave is created and the enclave has a priority, which will be used in dispatching and executing the work units. However, one example of determining a priority value is described in detail in co-pending U.S. patent application, Ser. No. 08/222,752, entitled "APPARATUS AND METHOD FOR MANAGING A SERVER WORKLOAD ACCORDING TO CLIENT PERFORMANCE GOALS IN A CLIENT/SERVER DATA PROCESSING SYSTEM", filed on Apr. 04, 1994 and assigned to International Business Machines Corporation, which is incorporated herein by reference in its entirety. Once the enclave priority is determined, it is placed within the EncbDP and EncbNdp fields of the enclave control block, STEP 116 "PLACE VALUE FOR ENCLAVE PRIORITY INTO ENCB."

Thereafter, the enclave control block is attached to the enclave vector table. Initially, a determination is made as to whether the enclave vector table is full, INQUIRY 118 "IS ENVT FULL?" Should the table be full, a larger enclave vector table is allocated and the current enclave vector table is copied into the new, larger enclave vector table, STEP 120 "ALLOCATE LARGER ENVT." The larger enclave vector table is the one used from this point forward.

After allocating a larger enclave vector table or if the enclave vector table is not full, a further determination is made as to whether the sequence number in the enclave vector table (i.e., EnvtNextAvailSeqNum) is zero, INQUIRY 122. If the sequence number is zero, then it is set to one, STEP 124 "SET SEQ. NO.=1." Thereafter, or if the sequence number is not equal to zero, the sequence number is placed in the enclave control block. In particular, the value in EnvtNextAvailSeqNum is placed in EncbTokenSeq# of the EncbToken. Further, the sequence number in the enclave vector table (i.e., EnvtNextAvailSeqNum) is incremented by one, STEP 126 "PLACE SEQ. NO. INTO ENCB; INCREMENT SEQ. NO."

Furthermore, the offset of the next available enclave vector table entry is placed in the enclave control block, such that the enclave control block points to the enclave vector table, STEP 128 (FIG. 5b) "SET EncbEnvt_offset." In particular, a field referred to as EncbEnvt_offset in the enclave control block is set equal to EnvtFreeEntryPtr of the enclave vector table. Additionally, EncbPseudoId is set equal to (EnvtFreeEntryPtr−Addr(Envt)−EnvtHeaderLength)/EnvteSize+1, STEP 130 "SET EncbPseudoID, and EnvtFreeEntryPtr is set equal to Envte_next_Free_Ptr(EncbPseudoId), STEP 132 "PLACE ADDRESS OF NEXT FREE ENTRY IN ENVT." In one embodiment, the EnvtHeaderLength is a decimal field indicating the length of the header of the enclave vector table and EnvteSize is a constant representing the size of one entry in the enclave vector table. In one example, EnvtHeaderLength may be included in the structure of the enclave vector table.

In addition to the above, the address of the enclave control block is placed into the enclave vector table entry so that the table entry points to the ENCB (i.e., Envte_EncbPtr (EncbPseudoId)), STEP 134. Additionally, the EncbPseudoIDBit0, which is a high order bit in EncbPseudoID of the enclave control block, is set, STEP 136. Further, the number of vector table entries in use is incremented by one (i.e., EnvtEntriesInUse=EnvtEntriesInUse+1), STEP 138 "INCREMENT NUMBER OF ENTRIES IN USE."

Subsequent to setting the appropriate fields, the enclave control block is placed on a queue of inuse enclave control blocks, STEP 140. In particular, the pointers, EncbNext and EncbPrev, are appropriately set. Further, the enclave control block is placed on a queue of owned enclave control blocks for the owning address, STEP 142. Specifically, the pointers, EncbOwnerOucbPtr, EncbOwnerNextEncb and EncbOwnerPrevEncb are appropriately set.

Subsequently, the enclave token (EncbToken), which includes the EncbEnvt_offset and EncbTokenSeq#, is passed to the invoker of the IWMECREA (i.e., the owner of the enclave, which is the transaction manager in this embodiment) via the field ETOKEN, STEP 144 "RETURN ETOKEN," and processing of enclave create is complete, STEP 146 "END."

Upon receiving the ETOKEN, the transaction manager may begin scheduling work units. In one embodiment, a work unit is scheduled via IEAMSCHD. One example of the syntax associated with IEAMSCHD is described below. (In this embodiment, some of the fields are listed as required and others are listed as optional. This is only one example and it may be different for other embodiments.):

| ?IEAMSCHD | EPADDR(xepaddr) |
|---|---|
| | PRIORITY(ENCLAVE) |
| | ENCLAVETOKEN |
| | (xenclavetoken) |
| | MINORPRIORITY |
| | ({xminorpriority|ZERO}) |

Where:
EPADDR(xepaddr) is the name (RS-type) (or address in register (2)–(12) ASM only) of a required pointer input that contains the address of the code (e.g., an SRB routine) to be executed under the work unit to be scheduled for asynchronous execution.

PRIORITY(ENCLAVE) specifies that the work unit is to be scheduled into an enclave. A work unit that is scheduled with PRIORITY=ENCLAVE is preemptable. The work unit will inherit its minor priority from the enclave and any CPU time used will be accumulated in the enclave. (In one embodiment, this attribute is designated along with the address space in which the work unit is to receive control. Typical address spaces include, for instance, a home address space and a primary address space.)

ENCLAVETOKEN(xenclavetoken) is the name (RS-type) (or address in register (2)–(12) ASM only) of a required 8 character input which contains the enclave token which represents the group of work units whose resources are to be managed by the System Resource Manager (SRM) of the operating system. The enclave token must be obtained prior to scheduling the work unit and may be obtained via ETOKEN of the IWMECREA macro.

MINORPRIORITY({xminorpriority|ZERO}) is the name (RS-type) (or address in register (2)–(12) ASM only) of an optional 8 bit input received from a user containing a minor priority that a work unit is to be assigned. Work units with a higher minor priority are dispatched before work units or tasks with a lower minor priority in the enclave. As an example, a minor priority of X'00' is the lowest and X'FF' is the highest.

DEFAULT: Zero. The minor priority is X'00'.

Figure 6:
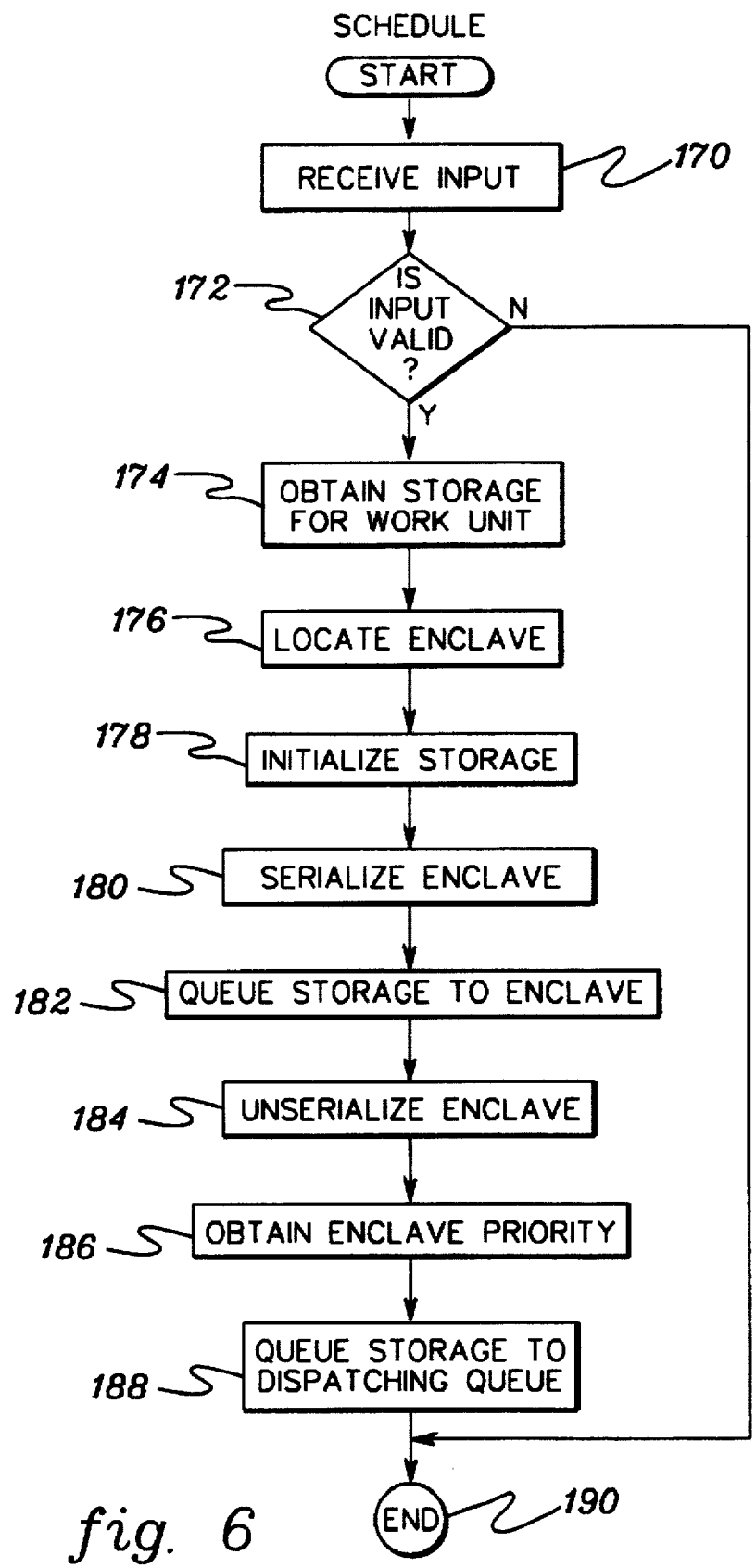
FIG. 6 depicts one example of the logic corresponding to scheduling a work unit, in accordance with the principles of the present invention.

One example of the logic associated with scheduling a work unit, in accordance with the principles of the present invention, is described in detail below with reference to FIG. 6. (This is only one example. It is possible in other examples for the steps described below to be performed in a different order or be combined with other steps.)

Initially, in order to invoke IEAMSCHD, the ETOKEN from the create macro and the minor priority from the user is received and stored in ENCLAVETOKEN and MINORPRIORITY, respectively, of the IEAMSCHD macro, STEP 170 "RECEIVE INPUT." After the input is received, a determination is made as to whether the input is valid, INQUIRY 172 "IS INPUT VALID?" If the input is invalid, processing of IEAMSCHD terminates, STEP 190 "END." However, if the input is valid, then the operating system obtains storage for the work unit, in any known manner, STEP 174 "OBTAIN STORAGE FOR WORK UNIT."

Subsequent to obtaining the storage, the ENCLAVETOKEN is used to locate the enclave, STEP 176 "LOCATE ENCLAVE." In particular, EncbEnvt_offset of the ENCLAVETOKEN supplies the offset into the enclave vector table, which indicates where the enclave control block has been registered.

After locating the enclave control block, the storage previously obtained for the work unit is initialized with the values of ENCLAVETOKEN, MINORPRIORITY, the pseudo id (EncbPseudoID) of the control block, and the address of the enclave control block, STEP 178 "INITIALIZE STORAGE".

After the storage is initialized, the enclave control block is serialized so that no additions or deletions can be made to the enclave, except for those associated with the work unit being scheduled, STEP 180 "SERIALIZE ENCLAVE." After serialization, the work unit is queued to the enclave, STEP 182 "QUEUE STORAGE TO ENCLAVE." In particular, EncbFirstWEBAddr is set to point to the first work unit and the work unit is set to point to the enclave control block. Thereafter, serialization is released, in any known manner, STEP 184 "UNSERIALIZE ENCLAVE."

Next, the enclave priority is obtained from EncbDP of the enclave control block, STEP 186 "OBTAIN ENCLAVE PRIORITY," and the work unit is queued to the dispatching queue using, in accordance with the principles of the present invention, the retrieved enclave priority, STEP 188 "QUEUE STORAGE TO DISPATCHING QUEUE." The dispatching queue is in priority order.

In one embodiment, the retrieved enclave priority is considered the major priority for each work unit of the enclave. Each work unit may also have a minor priority, which indicates its dispatching priority relative to the other work units in the enclave.

Subsequent to placing the work unit on the dispatching queue, scheduling of the work unit is complete, STEP 190 "END."

At some later time, the scheduled work unit is dispatched by the operating system and executed by the transaction manager. This processing occurs for each work unit of the work request. When all of the work units have been processed or when no new work units are to be added to an enclave, the enclave may be deleted. In order to delete an enclave, such that no work units exist within the enclave and no new work units may be scheduled into the enclave, IWMEDELE is used. One example of the syntax of IWMEDELE is described below. (In this embodiment, some of the fields are listed as required and others are listed as optional. This is only one example and it may be different for other embodiments.):

| ?IWMEDELE | ETOKEN(xetonken) [RETCODE(xretcode)] [RSNCODE(xrsncode)] |
| --- | --- |

Where:

ETOKEN(xetoken) is the name (RS-type) (or address in register (2)–(12) ASM only) of a required 8 character input which contains the enclave token to be returned.

[RETCODE(xretcode) is the name (RS-type) (or register (2)–(12) ASM only) of an optional fullword output variable into which the return code is to be copied from GPR 15.

[RSNCODE(xrsncode) is the name (RS-type) (or register (2)–(12) ASM only) of an optional fullword output variable into which the reason code is to be copied from GPR 0.

One example of the logic associated with deleting an enclave, in accordance with the principles of the present invention, is described in detail below with reference to FIG. 7. (This is only one example. It is possible in other examples for the steps described below to be performed in a different order or be combined with other steps.)

Figure 7:
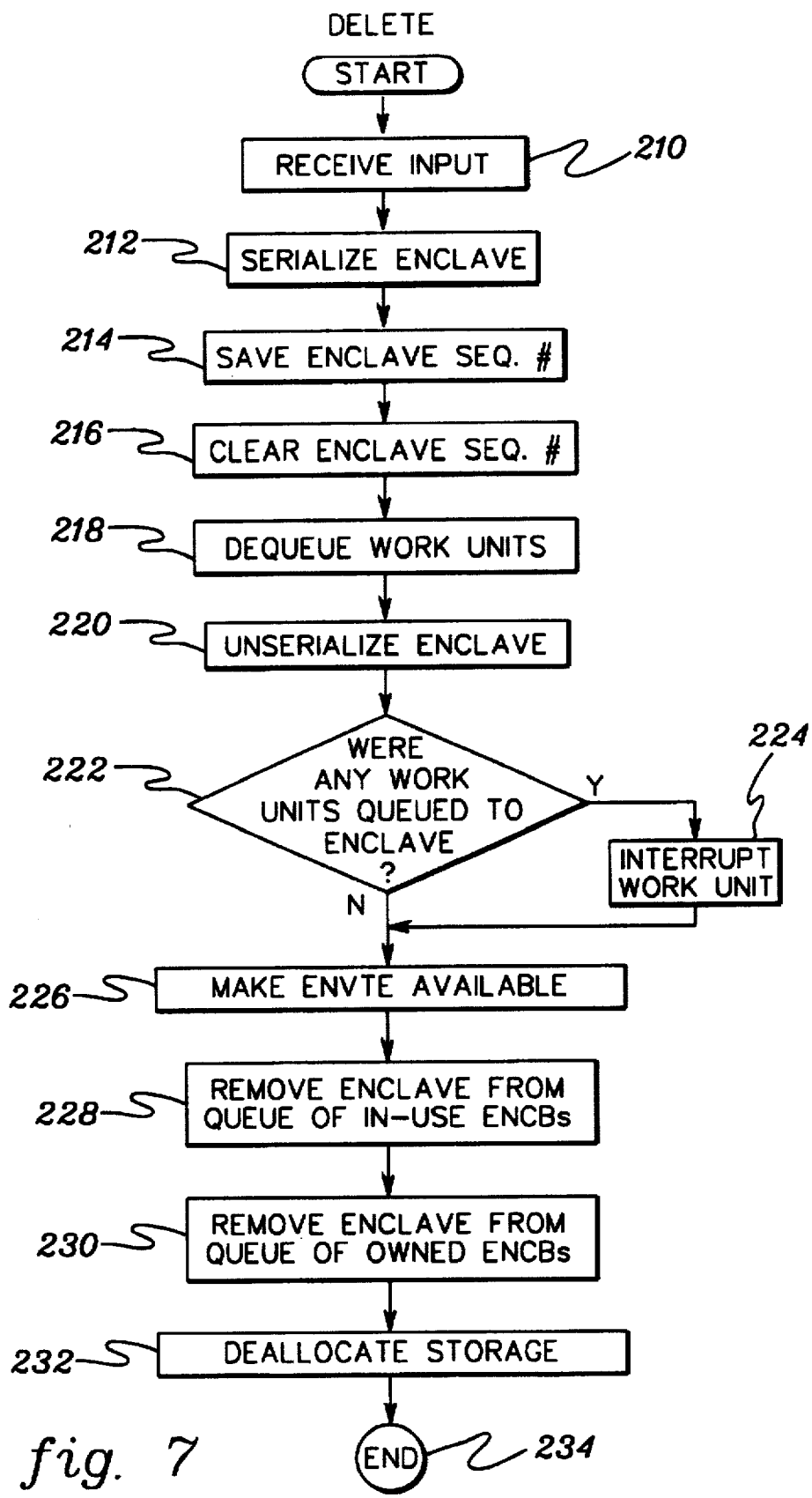
FIG. 7 depicts one example of the logic corresponding to deleting an enclave, in accordance with the principles of the present invention.

Referring to FIG. 7, when IWMEDELE is invoked by, for instance, the transaction manager, the enclave token (ETOKEN) of the enclave to be deleted is passed to the operating system, STEP 210 "RECEIVE INPUT." After the input is received, the enclave is serialized in any known manner such that no information may be added to or deleted from the enclave, STEP 212 "SERIALIZE ENCLAVE."

Subsequent to serialization, the enclave sequence number (EncbTokenSeq#) is saved in storage, STEP 214 and then, the sequence number is cleared by setting EncbTokenSeq# to zero, STEP 216. This makes the enclave token invalid.

Thereafter, each work unit queued to the enclave is dequeued, STEP 218 "DEQUEUE WORK UNITS." In particular, the operating system locates the first work unit by referring to EncbFirstWEBAddr in the enclave control block. When the first work unit is located, it is changed from an enclave work unit to a standard work unit by disassociating the work unit from the enclave. For a standard work unit, the priority of the work unit is derived from its home address space, instead of the enclave. After changing the enclave work unit to a standard work unit, the enclave sequence number previously saved in storage is placed into the work unit. The above is repeated for each of the work units queued in the enclave.

Subsequent to dequeuing the work units, the enclave is unserialized, STEP 220, and a determination is made as to whether there were any work units queued to the enclave, INQUIRY 222 "WERE ANY WORK UNITS QUEUED TO ENCLAVE?" If there were work units queued to the enclave, each central processing unit running a dequeued work unit, as indicated by the saved enclave sequence number in the work units, is signaled to interrupt the work unit, STEP 224 "INTERRUPT WORK UNIT." The work unit loses control of the processor and gets placed on the dispatching queue with the priority of its home address space.

Thereafter, or if there were no work units queued to the enclave, the enclave vector table entry for the deleted enclave is made available, STEP 226 "MAKE ENVTE AVAILABLE." Specifically, Envt_Next_Free_Ptr is set equal to EnvtFreeEntryPtr, the high order bit (Ente_Available) of the Envte_Next_Free_Ptr is set on, EnvtFreeEntryPtr is set equal to addr(Envte), and EnvtEntriesInUse is decremented by 1.

Thereafter, the enclave is removed from the queue of in-use enclave control blocks by appropriately adjusting the EncbNext and EncbPrev pointers, STEP 228 "REMOVE ENCLAVE FROM QUEUE OF IN-USE ENCBS." Additionally, the enclave is removed from the queue of owned enclave control blocks in the owning address space by appropriately adjusting the EncbOwnerPrevEncb and EncbOwnerNextEncb pointers, STEP 230 "REMOVE ENCLAVE FROM QUEUE OF OWNED ENCBS."

Subsequent to removing the enclave from the queues, the storage for the enclave is deallocated, STEP 232 "DEALLOCATE STORAGE," and processing of the delete service is complete, STEP 234 "END."

Described above in detail is a procedure for separating priority of a work unit from the address space which owns or executes the work unit. In accordance with the principles of the present invention, the priority of a work unit is derived from the priority of the enclave. Thus, the priority of the enclave and the work unit is independent from any address space priority. The work unit will execute in an address space at a priority based on the enclave priority and not the address space priority. The address space priority is overridden.

In addition to separating the priority from the address space, accounting is also separated from the address space, in accordance with the principles of the present invention. In particular, while the work unit is executing, any resources consumed by the work unit are accumulated by the operating system. These resources are accrued to the initiator of the work units. That is, for example, the resources are accrued to the requestor of the work or to the owner of the enclave, i.e., the address space that invoked the enclave create service. In one example, the CPU time accumulated for the enclave is stored in the enclave control block in a field identified as EncbTotalCpuTime. Thereafter, reports may be issued to the initiator reporting on the accrued resources or in another example, the initiator (e.g., the enclave owner) may query the enclave control block to determine the amount of resources used by the work units associated with the enclave.

Additionally, in one embodiment, when the enclave terminates, the total resources used by the work units of the enclave is stored in the owning address space's control block for future reference and/or reporting.

In a further embodiment of the invention, it is possible to modify the enclave priority when it is determined that performance objectives associated with the enclave are not being met. In order to modify the enclave priority, the new priority value is stored in EncbNdp of the enclave control block, and then, at the appropriate time the value in EncbNdp is copied to EncbDP. Thereafter, the enclave executes at the new priority value. The manner in which a particular priority value is determined is not important for this invention. What is important is the fact that the priority is associated with an enclave and that the enclave priority may be adjusted to meet the performance objectives of the data processing system. However, one example of a technique for determining a particular priority value is discussed in detail in co-pending U.S. patent application, Ser. No. 08/222,752, entitled "APPARATUS AND METHOD FOR MANAGING A SERVER WORKLOAD ACCORDING TO CLIENT PERFORMANCE GOALS IN A CLIENT/SERVER DATA PROCESSING SYSTEM", filed on Apr. 04, 1994 and assigned to International Business Machines Corporation, which is incorporated herein by reference in its entirety.

Figure 8:
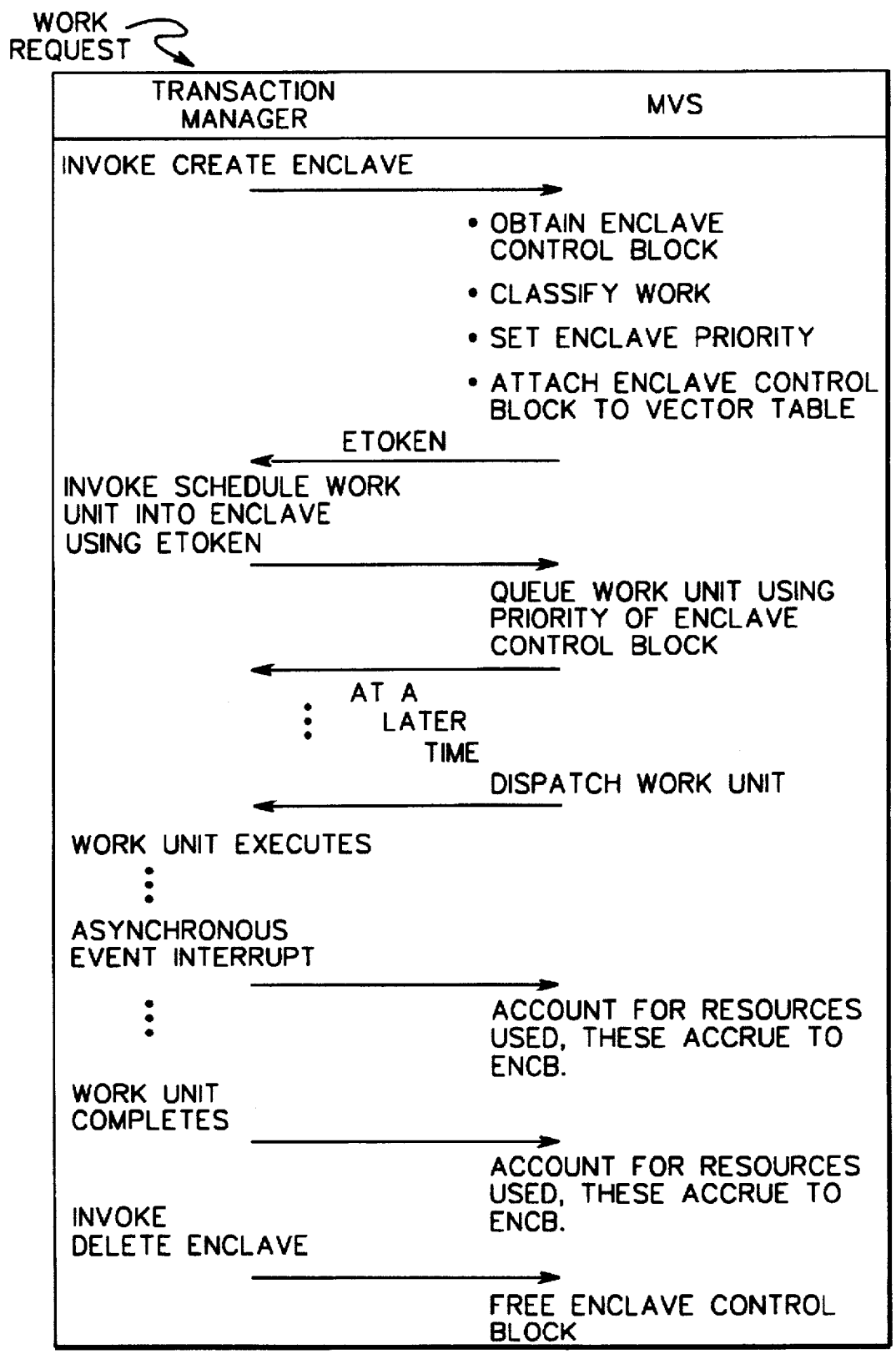
FIG. 8 depicts an overview of one example of the interaction between a transaction manager and an operating system in performing the technique of the present invention.

Described in detail above is a technique for separating work unit priority and accounting from address spaces. A summary of the interaction between, for example, a transaction manager and an operating system in performing the technique of the present invention is depicted in FIG. 8. Each of the steps shown in FIG. 8 has been described in detail above. FIG. 8 is just one example. It will be apparent to those skilled in the relevant art that variations to the above-described processing are possible, and these are considered within the scope of the invention, as claimed. For example, certain steps may be altered, performed in a different sequence or deleted. Further, the interaction may be between different systems, different operating systems or different transaction managers.

Although a preferred embodiment has been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for enabling requestor-based accounting of executions of program work units in a data processing system also supporting address-space-based accounting, a shared storage in the data processing system being addressed through one or more virtual storage address spaces assignable to any requestor, each virtual address space containing a set of contiguous numerical addresses which may be the same in different virtual address spaces, each virtual address space having a unique address space identifier and an associated address translation table, the virtual addresses in each virtual address space being dynamically translatable to real address locations in shared storage by processor hardware/software using the address translation table, each of said virtual address spaces having an assigned address space priority, and program work units being located in the one or more of said virtual address spaces of any user, said method comprising executing by the data processing system program work units for a plurality of requestors, assigning to each requestor a home virtual address space which need not be the virtual address space containing a program work unit to be executed for the the requestor for which the virtual address spaces have different address space priorities, generating an enclave control block (the enclave) in system storage to coordinate system accounting for any requestor, assigning an enclave priority to the enclave for use by work units of the requestor independently of the address space priorities of the virtual address spaces containing program work units of the requestor, referencing each program work unit (work unit) of the requestor on an enclave queue with the requestor's enclave priority to collect the work units of the requestor for execution by the data processing system independent of the address space priorities of the program work units, scheduling for execution in an execution scheduling queue each work unit in each enclave queue with a scheduling priority equal to the enclave priority of the work unit in the enclave queue after execution is requested for the work unit to support the requestor-based accounting, scheduling for execution any work unit of the requestor not in the enclave queue by putting the work unit into the execution scheduling queue with a scheduling priority equal to a home address space priority of the virtual address space containing the work unit after execution is requested for the work unit to support the address-space-based accounting, and initiating execution of a work unit having a highest scheduling priority in the execution scheduling queue when a processor in the system is available to execute the work unit.

2. A method for enabling requestor-based accounting of executions of program work units in a data processing system also supporting address-space-based accounting as defined in claim 1, said method further comprising:

assigning an enclave subpriority to each work unit of the enclave in the enclave queue, and providing to the execution scheduling queue both the enclave priority and the enclave subpriority for each work unit of the enclave ready for execution for controlling the execution sequence of work units of the requestor associated with the enclave.

3. A method for enabling requestor-based accounting of executions of program work units in a data processing system also supporting address-space-based accounting as defined in claim 1, said method further comprising:

setting a home address space priority in an address space control block (ASCB) associated with each virtual address space to provide a scheduling priority indicator for each work unit contained in the virtual address space, and using the scheduling priority indicator in the ASCB as the execution priority of the work unit when the work unit is ready for execution and is put in the execution scheduling queue when the work unit is not assigned to an enclave.

4. A method for enabling requestor-based accounting of executions of program work units in a data processing system also supporting address-space-based accounting as defined in claim 2, said method further comprising:

generating a work unit block (WUB) to represent each of the work units, enabling the WUB to control execution of the work unit by writing a pointer to an entry point in executable code representing the work unit to associate the WUB with the work unit, associating each work unit with its home address space by writing in each WUB a direct or indirect pointer to the ASCB of the home address space asssociated with the work unit, and also associating each work unit with an enclave when the work unit is assigned to an enclave by writing in the WUB a direct or indirect pointer to the enclave control block of the requestor using the work unit.

5. A method for enabling requestor-based accounting of executions of program work units in a data processing system also supporting address-space-based accounting as defined in claim 3, said method further comprising:

utilizing the enclave control block to represent an associated enclave queue which may enqueue any number of work units, chaining into the enclave queue a direct or indirect pointer to each of the work units in the enclave for which execution has been requested by the requestor of the enclave, and setting in each enclave control block a representation of a next work unit in the associated enclave queue to be scheduled for execution.

6. A method for enabling requestor-based accounting of executions of program work units in a data processing system also supporting address-space-based accounting as defined in claim 5, said method further comprising:

selecting the work unit having the highest enclave priority currently in the enclave queue as the next work unit of the enclave to be scheduled for execution in the execution scheduling queue.

7. A method for enabling requestor-based accounting of executions of program work units in a data processing system also supporting address-space-based accounting as defined in claim 1, said method further comprising:

changing the execution priority of a work unit in the enclave queue to the priority of the associated enclave when the priority of the enclave is changed by the system.

8. A method for enabling requestor-based accounting of executions of program work units in a data processing system also supporting address-space-based accounting as defined in claim 1, said method further comprising:

changing the execution priority of a work unit in the execution scheduling queue to the priority of the enclave associated with the work unit when the priority of the enclave is changed by the system while the work unit is on the execution scheduling queue.

9. A method for enabling requestor-based accounting of executions of program work units in a data processing system also supporting address-space-based accounting as defined in claim 1, said method further comprising:

inserting each work unit having an enclave priority into the enclave queue with an enclave subpriority determined by the home address space priority of the work unit.

10. A method for enabling requestor-based accounting of executions of program work units in a data processing system also supporting address-space-based accounting as defined in claim 1, said method further comprising:

deleting an enclave from the system when termination conditions occur which have been specified for the enclave by the requestor associated with the enclave.

11. A method for enabling requestor-based accounting of executions of program work units in a data processing system also supporting address-space-based accounting as defined in claim 1, said method further comprising:

disassociating each work unit from the enclave queue after execution of the work unit.

12. A method for enabling requestor-based accounting of executions of program work units in a data processing system also supporting address-space-based accounting as defined in claim 1, said method further comprising:

provided enclave space in an accounting record in the system associated with each enclave existing in the system, collecting accounting information occurring during the execution of each work unit of an enclave, and posting the accounting information for each work unit into the accounting record in the space provided for the enclave associated with the work unit.

13. A method for enabling requestor-based accounting of executions of program work units in a data processing system also supporting address-space-based accounting as defined in claim 12, said posting step further comprising:

posting in the enclave control block each work unit associated with an enclave at least before the associated enclave is deleted from the system.

14. A method for enabling requestor-based accounting of executions of program work units in a data processing system also supporting address-space-based accounting as defined in claim 13, said posting step further comprising:

specifying in the posting step system resources used by the work unit for executing the work unit.

15. A method for enabling requestor-based accounting of executions of program work units in a data processing system also supporting address-space-based accounting as defined in claim 13, said posting step further comprising:

deleting an enclave from the data processing system when terminating conditions occur as specified for the enclave by the requestor associated with the enclave.

* * * * *